US010107132B2

(12) United States Patent
Wu et al.

(10) Patent No.: US 10,107,132 B2
(45) Date of Patent: Oct. 23, 2018

(54) EMBEDDED SENSOR SYSTEM

(71) Applicant: UNITED TECHNOLOGIES CORPORATION, Farmington, CT (US)

(72) Inventors: Xin Wu, East Hartford, CT (US); Nicholas Charles Soldner, Southbury, CT (US); Cagatay Tokgoz, East Hartford, CT (US); Joseph V. Mantese, Ellington, CT (US); Joseph Zacchio, Wethersfield, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 219 days.

(21) Appl. No.: 14/704,715

(22) Filed: May 5, 2015

(65) Prior Publication Data

US 2016/0326904 A1    Nov. 10, 2016

(51) Int. Cl.
| | |
|---|---|
| *F01D 21/00* | (2006.01) |
| *F01D 5/28* | (2006.01) |
| *H04Q 9/00* | (2006.01) |
| *F01D 17/02* | (2006.01) |
| *F01D 17/20* | (2006.01) |
| *G06K 19/077* | (2006.01) |

(52) U.S. Cl.
CPC ............. *F01D 21/003* (2013.01); *F01D 5/28* (2013.01); *F01D 17/02* (2013.01); *F01D 17/20* (2013.01); *G06K 19/07771* (2013.01); *G06K 19/07777* (2013.01); *H04Q 9/00* (2013.01); *F05D 2300/507* (2013.01); *H04Q 2209/40* (2013.01)

(58) Field of Classification Search
CPC ..... H04B 5/0062; F01D 17/20; F01D 21/003; F01D 5/28
See application file for complete search history.

(56) References Cited

U.S. PATENT DOCUMENTS

| | | | |
|---|---|---|---|
| 8,482,434 B2 * | 7/2013 | Bajekal ................. | B64C 27/008 340/539.26 |
| 2004/0113790 A1 * | 6/2004 | Hamel .................. | A61F 2/4657 340/572.1 |
| 2007/0080810 A1 * | 4/2007 | Juds ....................... | G08B 13/24 340/572.8 |
| 2009/0167498 A1 * | 7/2009 | Fukuda ............ | G06K 19/07749 340/10.1 |

(Continued)

FOREIGN PATENT DOCUMENTS

EP    2224379 A1    9/2010

OTHER PUBLICATIONS

European Search Report for Application No. 16158448.7-1607; dated Oct. 17, 2016; 6 pgs.

*Primary Examiner* — Manish S Shah
*Assistant Examiner* — Timothy Graves
(74) *Attorney, Agent, or Firm* — Cantor Colburn LLP

(57) ABSTRACT

A magnetic communication system for a gas turbine engine may include a sensor coupled to a microcontroller. A low frequency radio-frequency identification integrated chip may be coupled to the microcontroller. A first coupling circuit may be coupled to the low frequency radio-frequency identification integrated chip and may include a first coil winding wound within a first core. The first coil winding operatively associated with a low frequency magnetic flux.

12 Claims, 4 Drawing Sheets

(56) References Cited

U.S. PATENT DOCUMENTS

| | | |
|---|---|---|
| 2011/0133950 A1 | 6/2011 | Subramanian et al. |
| 2012/0068003 A1* | 3/2012 | Bajekal .............. B64C 27/008 244/17.11 |
| 2012/0197597 A1* | 8/2012 | Mitchell .............. F01D 17/02 702/188 |
| 2013/0231893 A1 | 9/2013 | Miller et al. |
| 2014/0083176 A1 | 3/2014 | Rhoden |

* cited by examiner

EMBEDDED SENSOR SYSTEM

STATEMENT OF GOVERNMENT INTEREST

This invention was made with Government support under contract number DE-FE0012299 awarded by the United States Department of Energy. The Government has certain rights in the present disclosure.

TECHNICAL FIELD

The subject matter of the present disclosure relates generally to gas turbine engines and, more particularly, relates to sensors for such gas turbine engines.

BACKGROUND

Various components of gas turbine engines, such as those engines used to power modern aircraft, often require in-situ wear and status monitoring for maintenance and performance purposes. Some gas turbine engine components implement embedded sensors for such monitoring. Typically, these embedded sensors include radio frequency identification (RFID) capabilities that operate at frequencies of tens or hundreds of MHz. The RFID allows the embedded sensor to communicate wirelessly with an external reader system through the surface of the gas turbine engine component.

While generally effective, such RFID embedded sensors are less efficient when used with metallic or highly conductive gas turbine engine components such as, for example, aircraft skins or turbine blades. Directly embedding such RFID sensors underneath the metallic surface of these components make the wireless reading of the sensors difficult. In particular, the operating frequency of tens or hundreds of MHz interacts with the conductive surfaces to create eddy currents that prevent significant magnetic field penetration through the conductive surface so that the ability of the external reader system to read the embedded RFID sensor is reduced and, in some instances, nearly impossible. As an example in some arrangements, the eddy currents not only exist on the surface of the conductive component, but may also be created on the vertical and horizontal surfaces of the housing which contains the sensor as well.

SUMMARY

In accordance with an aspect of the disclosure, a magnetic communication system for a gas turbine engine may include a sensor coupled to a microcontroller. A low frequency radio-frequency identification integrated chip may be coupled to the microcontroller. A first coupling circuit may be coupled to the low frequency radio-frequency identification integrated chip and may include a first coil winding wound within a first core. The first coil winding may be operatively associated with a low frequency magnetic flux.

In accordance with another aspect of the disclosure, the first core may include an inner pillar circumscribed by an outer wall so that the first coil winding may be wound around the inner pillar such that the first coil winding may be between the inner pillar and the outer wall.

In accordance with yet another aspect of the disclosure, the first core may be manufactured from a ferromagnetic material.

In accordance with still yet another aspect of the disclosure, the first coil winding may be a copper winding.

In accordance with a further aspect of the disclosure, an external reader may include a second coupling circuit that may be wirelessly communicable with the first coupling circuit via a magnetic flux coupling. The second coupling circuit may include a second coil winding wound within a second core.

In accordance with an even further aspect of the disclosure, the sensor may be one of a digital sensor and an analog sensor.

In accordance with still an even further aspect of the disclosure, the sensor may be one of an acceleration sensor, a temperature sensor, and a strain sensor.

In accordance with another aspect of the disclosure, a gas turbine engine is provided. The gas turbine engine may include a sensor system embedded in a conductive component operationally associated with the engine. The sensor system may include a sensor coupled to a microcontroller, a low frequency radio-frequency identification integrated chip coupled to the microcontroller, and a first coupling circuit coupled to the low frequency radio-frequency identification integrated chip. The first coupling circuit may include a first coil winding wound within a first core. The first coil winding may be operatively associated with a low frequency magnetic flux.

In accordance with still another aspect of the disclosure, the conductive component may be one of an airfoil, a blade, a nacelle, and a vane.

In accordance with another aspect of the disclosure, a method of enabling magnetic wireless communication between a sensor system embedded in a conductive component of a gas turbine engine and an external reader by reducing eddy currents produced therefrom is provided. The method may entail the step of concentrating and directing a first low frequency magnetic flux produced by a first core of the sensor system for penetration through the conductive component. Another step may be generating a second low frequency magnetic flux via the external reader. Yet another step may be concentrating and directing a second low frequency magnetic flux produced by a second core of the external reader to couple with the first low frequency magnetic flux to transfer power and communicate data between the external reader and the sensor system.

In accordance with yet another aspect of the disclosure, the external reader may include a coupling circuit that is wirelessly communicable with the first coil winding of the sensor system via a magnetic flux coupling.

In accordance with still yet another aspect of the disclosure, the sensor system may include one of an acceleration sensor, a temperature sensor, and a strain sensor.

In accordance with a still a further aspect of the disclosure, the sensor system may include one of a digital sensor and an analog sensor.

Other aspects and features of the disclosed systems and methods will be appreciated from reading the attached detailed description in conjunction with the included drawing figures. Moreover, selected aspects and features of one example embodiment may be combined with various selected aspects and features of other example embodiments.

BRIEF DESCRIPTION OF THE DRAWINGS

For further understanding of the disclosed concepts and embodiments, reference may be made to the following detailed description, read in connection with the drawings, wherein like elements are numbered alike, and in which.

It is to be noted that the appended drawings illustrate only typical embodiments and are therefore not to be considered limiting with respect to the scope of the disclosure or claims. Rather, the concepts of the present disclosure may apply within other equally effective embodiments. Moreover, the drawings are not necessarily to scale, emphasis generally being placed upon illustrating the principles of certain embodiments.

DETAILED DESCRIPTION

Throughout this specification the terms "downstream" and "upstream" are used with reference to the general direction of gas flow through the engine and the terms "axial", "radial" and "circumferential" are generally used with respect to the longitudinal central engine axis.

Figure 1:
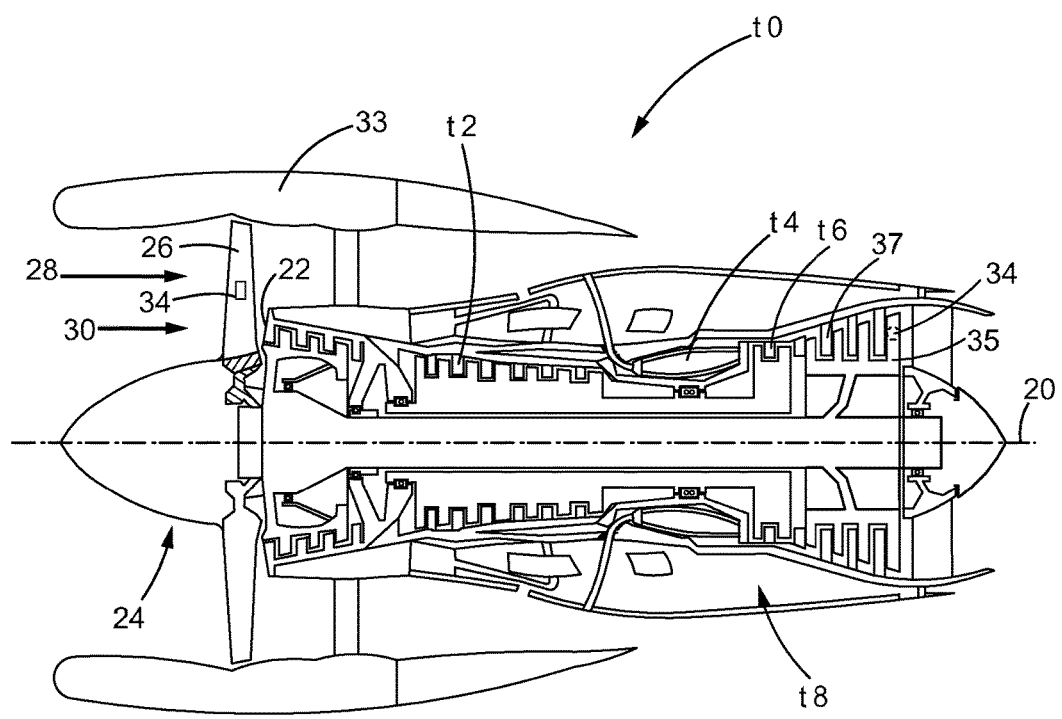
FIG. 1 is a side view of a gas turbine engine with portions sectioned and broken away to show details of an embodiment.

Referring now to FIG. 1, a gas turbine engine constructed in accordance with the present disclosure is generally referred to by reference numeral 10. The gas turbine engine 10 includes a compressor section 12, a combustor 14 and a turbine section 16. The serial combination of the compressor section 12, the combustor 14 and the turbine section 16 is commonly referred to as a core engine 18. The engine 10 is circumscribed about a longitudinal central axis 20.

Air enters the compressor section 12 at the compressor inlet 22 and is pressurized. The pressurized air then enters the combustor 14. In the combustor 14, the air mixes with jet fuel and is burned, generating hot combustion gases that flow downstream to the turbine section 16. The turbine section 16 extracts energy from the hot combustion gases to drive the compressor section 12 and a fan 24, which includes a plurality of airfoils 26 (two airfoils shown in FIG. 1). As the turbine section 16 drives the fan 24, the airfoils 26 rotate so as to take in more ambient air. This process accelerates the ambient air 28 to provide the majority of the useful thrust produced by the engine 10. Generally, in some modern gas turbine engines, the fan 24 has a much greater diameter than the core engine 18. Because of this, the ambient air flow 28 through the fan 24 can be 5-10 times higher, or more, than the core air flow 30 through the core engine 18. The ratio of flow through the fan 24 relative to flow through the core engine 18 is known as the bypass ratio.

Figure 2:
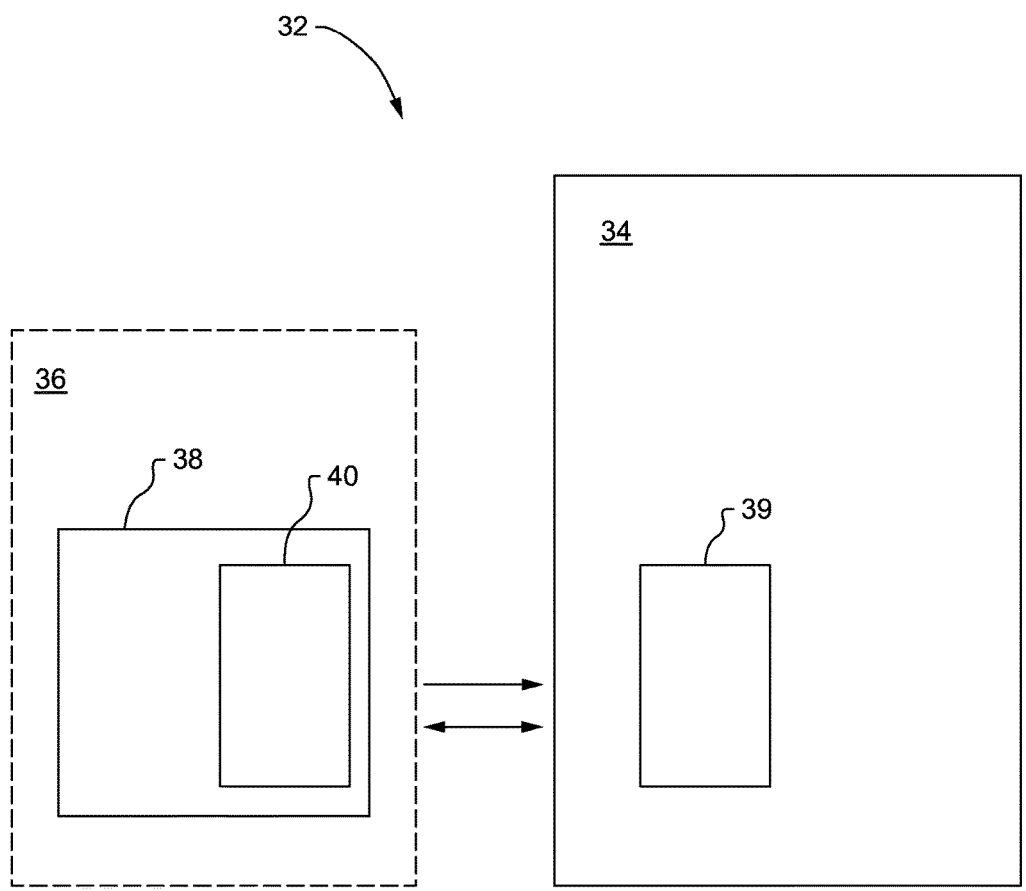
FIG. 2 is a schematic diagram illustrating a sensor system communicating with an external reader system, constructed in accordance with an embodiment.

As shown in FIG. 2, the gas turbine engine 10 may be associated with at least one magnetic communication system 32. The at least one magnetic communication system 32 may include a sensor system 34 and an external base station 36. The sensor system 34 may be embedded underneath a metallic or conductive component 35 of the gas turbine engine 10 such as, but not limited to, one of the airfoils 26, a blade of the compressor section 12, a blade of the turbine section 16, a nacelle 33, or a vane 37. The sensor system 34 may communicate wirelessly with an external reader system 38 that is associated with the external base station 36. The external reader system 38 may be external to the sensor system 34. Moreover, the sensor system 34 may produce a magnetic flux that is concentrated and directed by a first core 39 of the sensor system 34 to penetrate through the conductive component 35 for coupling with a magnetic flux produced by the external reader system 38 that is similarly concentrated and directed by a second core 40 of the external reader system 38.

Figure 3:
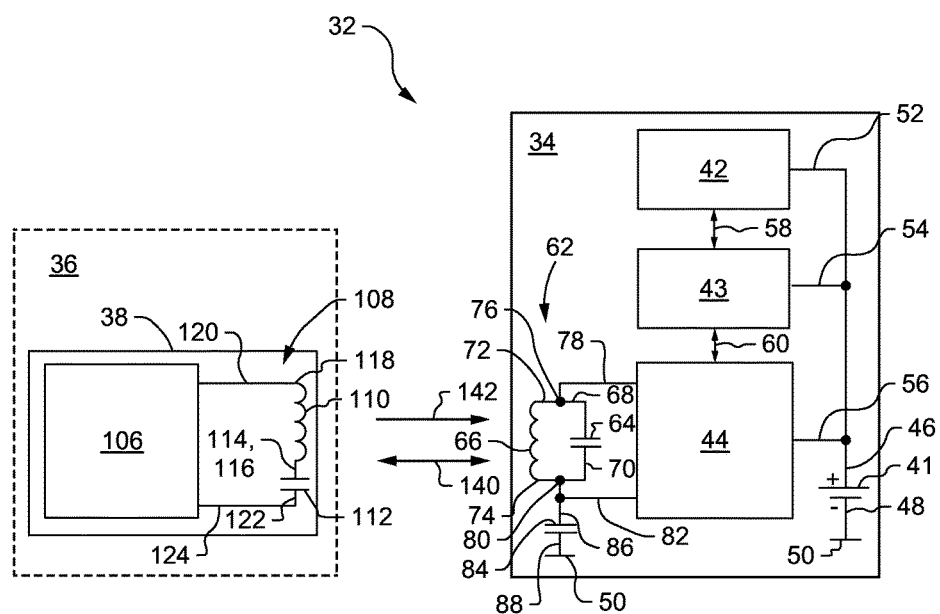
FIG. 3 is a detailed schematic diagram illustrating a sensor system communicating with an external reader system, constructed in accordance with an embodiment.

With reference to FIG. 3, the sensor system 34 may include a battery 41, a sensor 42, a microcontroller 43, and a low frequency radio-frequency identification integrated chip 44 (LF RFID IC). The sensor 42 may be a digital or analog sensor for monitoring parameters of the component 35 such as, but not limited to, acceleration, temperature, and strain. As a non-limiting example, the microcontroller 43 may be a MSP430 FRAM MCU microcontroller and the LF RFID IC 44 may be a TMS37157 chip.

The battery 41 may include a positive end 46 and a negative end 48. The negative end 48 of the battery 41 may be connected to ground 50. The positive end 46 of the battery 41 may be connected to the sensor 42 via a lead line 52, the microcontroller 43 via lead line 54, and the LF RFID IC 44 via lead line 56. The sensor 42 may communicate with the microcontroller 43 via a first bus 58. The microcontroller 43 may communicate with the LF RFID IC 44 via a second bus 60. In an alternative embodiment, the sensor system 34 may optionally include an analog-to-digital converter, external to the microcontroller 43, to convert analog data from the sensor 42 to digital data for transfer to the LF RFID IC 44 via the microcontroller 43.

The LF RFID IC 44 may be coupled to a first coupling circuit 62. In particular, the first coupling circuit 62 may include a first capacitor 64 and a first inductor 66 connected in parallel. The first capacitor 64 may include a first end 68 and a second end 70. The first inductor 66 may include a first end 72 and a second end 74. The first end 68 of the first capacitor 64 may be connected to the first end 72 of the first inductor 66 at first node 76, which is further connected to the LF RFID IC 44 via a lead line 78. The second end 70 of the first capacitor 64 may be connected to the second end 74 of the first inductor 66 at a second node 80, which is further connected to the LF RFID IC 44 via a lead line 82. A second capacitor 84 includes a first end 86 connected to the second node 80 and the LF RFID IC 44. The second capacitor 84 also includes a second end 88 connected to ground 50. In an alternative embodiment, the first capacitor 64 and the first inductor 66 may be connected in series.

Figure 4:
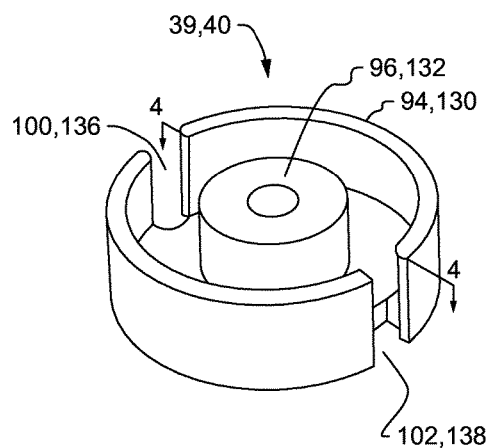
FIG. 4 is perspective view of a core of the sensor system and the external reader system of FIG. 2, constructed in accordance with an embodiment.
Figure 5:
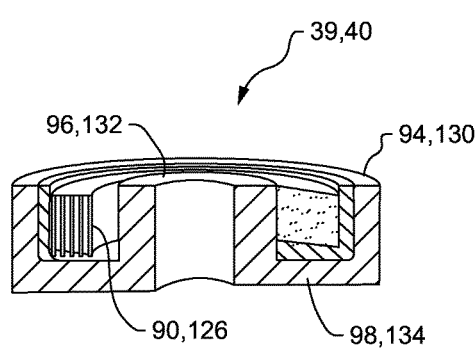
FIG. 5 is a sectional view of the core in FIG. 4 taken along line 4-4 with a coil winding disposed in the core, constructed in accordance with an embodiment.

With reference to FIGS. 4 and 5, the first inductor 66 includes a first coil winding 90 and the first core 39. The first coil winding 90 may be, but is not limited to, a copper winding. The first core 39 may be a ferromagnetic material. Moreover, the first core 39 may have a p-core shape (pot core) such that it includes a first cylindrical outer wall 94 circumscribing a first inner pillar 96 that extends from a first base 98 of the first core 39. The first outer wall 94 may be spaced apart from the first inner pillar 96 such that the first coil winding 90 winds around the first inner pillar 96 therebetween. The first outer wall 94 may include a first at least first slot 100. In an exemplary embodiment, the first outer wall 94 may also include a first at least second slot 102 such that the first at least first slot 100 may be disposed opposite the first at least second slot 102. The first and second ends 72, 74 of the first inductor 66 (the first coil winding 90) may pass through either or both of the first at least first slot 100 and the first at least second slot 102 to facilitate connection to the first capacitor 64. Although the first core 39 may have a p-core shape, the first core 39 is not limited to this shape and may have other suitable shapes.

Moving back to FIG. 3, the reader system 38 may include a low frequency reader 106 and a second coupling circuit 108. The second coupling circuit 108 may include a second inductor 110 connected in series to a third capacitor 112 such that a first end 114 of the second inductor 110 is connected to the first end 116 of the third capacitor 112. A second end 118 of the second inductor 110 is connected to the low frequency reader 106 via lead line 120. A second end 122 of the third capacitor 112 is connected to the low frequency reader 106 via lead line 124. In an alternative embodiment, the second inductor 110 and the third capacitor 112 may be connected in parallel. The reader system 38 may generate a magnetic flux at low frequencies of hundreds of kHz such as, but not limited to, 125 kHz.

Similar to the first inductor 66 of the sensor system 34, the second inductor 110 of the reader system 38 includes a second coil winding 126 and the second core 40. As the second coil winding 126 and the second core 40 are similar to the first coil winding 90 and the first core 39, respectively, FIGS. 4 and 5 are referenced to illustrate similar parts. The second coil winding 126 may be, but is not limited to, a copper winding. The may be a ferromagnetic material. Moreover, the second core 40 may have a p-core shape (pot core) such that it includes a second cylindrical outer wall 130 circumscribing a second inner pillar 132 that extends from a second base 134 of the second core 40. The second outer wall 130 may be spaced apart from the second inner pillar 132 such that the second coil winding 126 winds around the second inner pillar 132 therebetween. The second outer wall 130 may include a second at least first slot 136. In an exemplary embodiment, the second outer wall 130 may also include a second at least second slot 138 such that the second at least first slot 136 may be disposed opposite the second at least second slot 138. The first and second ends 114, 118 of the second inductor 110 (second coil winding 126) may pass through either or both of the second at least first slot 136 and the second at least second slot 138 to facilitate connection to the third capacitor 112 and the low frequency reader 106, respectively. Although the second core 40 may have a p-core shape, the second core 40 is not limited to this shape and may have other suitable shapes.

In operation, the reader system 38 may communicate wirelessly with the sensor system 34 via a wireless digital data communication stream 140. The reader system 38 may also transfer power to the sensor system 34 via a wireless energy stream 142 such that a rectifier internal to the LF RFID IC 44 converts alternative current to direct current for powering the microcontroller 43. The sensor system 34 may be embedded in the metallic or conductive component 35 of the gas turbine engine 10. As an example shown in FIG. 1, the sensor system 34 may be embedded in a blade of the turbine section 16 for monitoring a parameter such as, but not limited to, temperature, acceleration, and strain. In particular, the microcontroller 43 may receive the monitored data from the sensor 42 via the first bus 58 for processing. In an exemplary embodiment, the sensor 42 may be an analog sensor in which case the microcontroller 43 will process and convert the received analog data from the sensor 42 to digital data via an internal analog-to-digital converter for transfer to the LF RFID IC 44. In another exemplary embodiment, the sensor 42 may be a digital sensor in which case the microcontroller 43 will process the received digital data for transfer to the LF RFID IC 44. Regardless of whether the sensor 42 is a digital or analog sensor, the LF RFID IC 44 will then receive the digital data from the microcontroller 43 via the second bus 60 in order to transcribe the digital data, in serial form, to low frequency radio-frequency identification data (LF RFID data). The LF RFID data may be selectively read by the reader system 38 via magnetic flux coupling between the first and second inductors 66, 110.

For example, the first core 39 concentrates and directs the magnetic flux produced by the first coil winding 90 of the first inductor 66 to penetrate through the conductive component 35 for coupling with the magnetic flux produced by the second coil winding 126 of the second inductor 110, which is similarly concentrated and directed by the second core 40. Implementing the first and second cores 39, 40 to direct the low radio frequency magnetic flux reduces the formation of eddy currents and allows power transfer and data communication through the conductive component 35.

In an exemplary embodiment, the battery 41 may be excluded from the sensor system 34 and the sensor 42 instead receives power from the wireless energy stream 142 via the LF RFID IC 44 and the microcontroller 43, which also receives power from the LF RFID IC 44.

Figure 6:
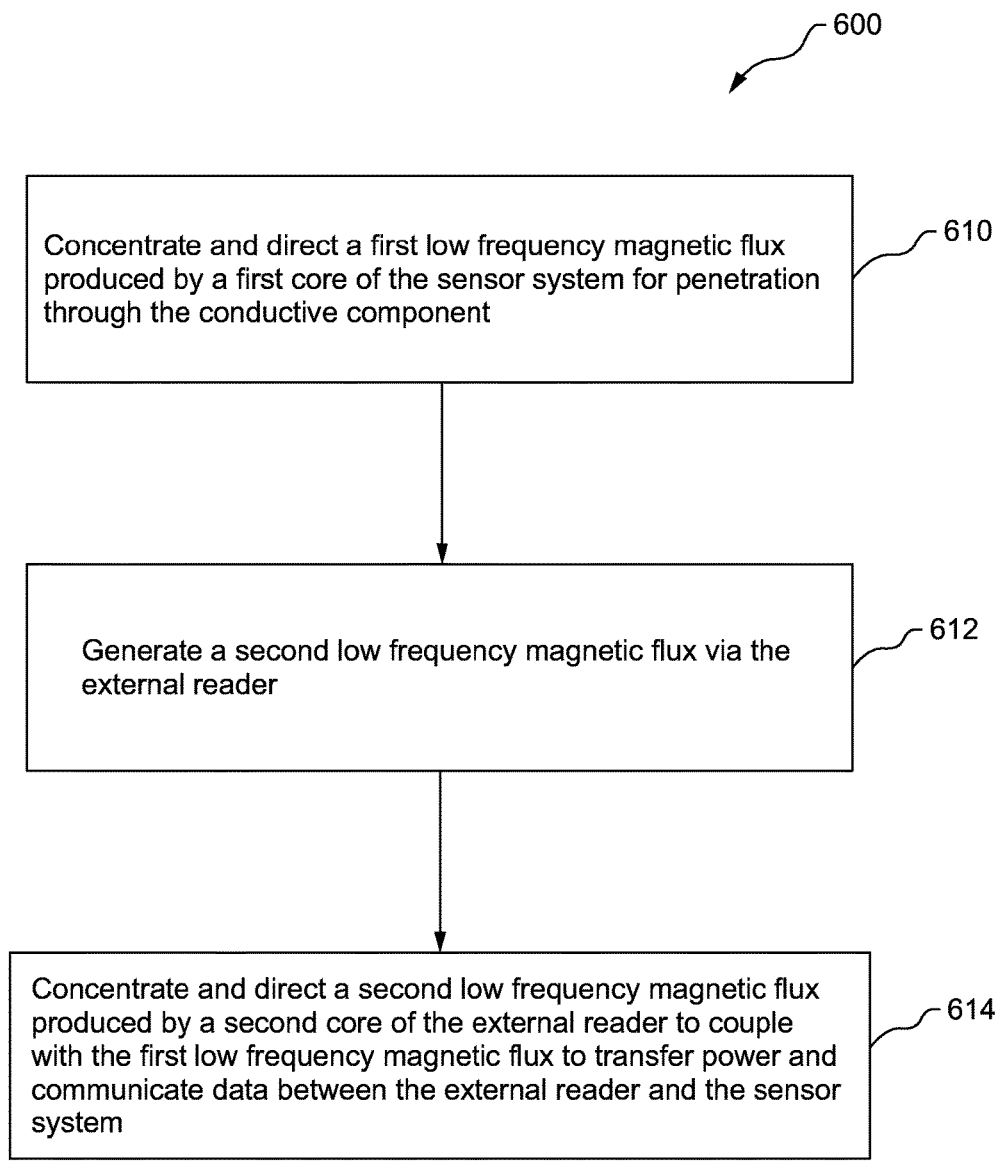
FIG. 6 is a process flow illustrating a sample sequence of steps which may be practiced in accordance with an embodiment.

FIG. 6 illustrates a process flow 600 of a sample sequence of steps which may be performed to enable magnetic wireless communication between a sensor system embedded in a conductive component of a gas turbine engine and an external reader by reducing eddy currents produced therefrom. Box 610 shows the step of concentrating and directing a first low frequency magnetic flux produced by a first core of the sensor system for penetration through the conductive component. Another step, as illustrated in box 612, is generating a second low frequency magnetic flux via the external reader. Yet another step depicted in box 614 may be concentrating and directing a second low frequency magnetic flux produced by a second core of the external reader to couple with the first low frequency magnetic flux to transfer power and communicate data between the external reader and the sensor system. The first core may be manufactured from a ferromagnetic material. The external reader may include a coupling circuit that is wirelessly communicable with the coil winding of the sensor system via a magnetic flux coupling. The sensor system may include one of an acceleration sensor, a temperature sensor, and a strain sensor. The sensor system may include one of a digital sensor and an analog sensor.

While the present disclosure has shown and described details of exemplary embodiments, it will be understood by one skilled in the art that various changes in detail may be effected therein without departing from the spirit and scope of the disclosure as defined by claims supported by the written description and drawings. Further, where these exemplary embodiments (and other related derivations) are described with reference to a certain number of elements it will be understood that other exemplary embodiments may be practiced utilizing either less than or more than the certain number of elements. Although the present disclosure has been described in connection with gas turbine engine components, it should be noted that such exemplary systems and methods as described above may utilize, as an example, sensor systems embedded in any conductive, metallic components in other industries such as, but not limited to, automotive and manufacturing, to name a few, and accordingly also fall within the spirit and scope of the present disclosure.

INDUSTRIAL APPLICABILITY

Based on the foregoing, it can be seen that the present disclosure sets forth systems and methods for enabling magnetic wireless communication between a sensor system embedded in a conductive, metallic component of a gas turbine engine and an external reader by reducing eddy currents produced therefrom. In addition, these systems and methods may enable power transfer and data communications between an external reader and a battery-less wireless sensor that is embedded in a metallic or conductive component for monitoring the physical health, load, and usage of the component, measuring parameters such as temperature, strain, and acceleration of the component, detecting counterfeit components, and identifying the component by part identification. The teachings of this disclosure may also be employed such that, the impact of eddy currents at low frequencies, such as below 50 MHz, is greatly reduced. Moreover, through the novel teachings set forth above, flexibility is provided to embed any type of sensor such as, but not limited to, temperature, acceleration, and strain sensors.

What is claimed is:

1. A system for a gas turbine engine, comprising:
    a rotary component comprising one or more of an airfoil, a blade, a nacelle and a vane for the gas turbine engine, the rotary component including:
        a conductive metallic surface having a first portion forming an airfoil,
        a sensor system embedded as a discrete system within the first portion of the conductive metallic surface, wherein communications therefrom penetrates through the conductive metallic surface,
        the sensor system including a magnetic communication system comprising a microcontroller, a sensor coupled to the microcontroller, and a low frequency radio-frequency identification integrated-chip coupled to the microcontroller, and a first coupling circuit of a plurality of coupling circuits, the first coupling circuit coupled to the low frequency radio-frequency identification integrated-chip, and
    a stationary component being external to and proximate the rotary component, the stationary component including a low frequency reader and a second coupling circuit of the plurality of coupling circuits, the second coupling circuit coupled to the low frequency reader;
    each of the plurality of coupling circuits including a capacitor and an inductor, the inductor including a coil winding wound within a core, the coil winding operatively associated with a low frequency magnetic flux, the core comprising a p-core shape (pot core) that includes a base, an outer wall that is cylindrically shaped and extends from the base, the outer wall circumscribing an inner pillar that extends from the base of the core, the core being a ferromagnetic material and the outer wall being spaced apart from the inner pillar such that the coil winding winds around the inner pillar therebetween, and the outer wall including a first slot and a second slot, the a first portion of the coil winding exits the core through the first slot and a second portion of the coil winding exits the core through the second slot,
    wherein
    in the rotary component, the first portion of the coil winding connects to the low frequency radio-frequency identification integrated-chip, and the second portion of the coil winding connects to the low frequency radio-frequency identification integrated-chip through the capacitor,
    in the stationary component, the first portion of the coil winding connects to the low frequency reader, and the second portion of the coil winding connects to the low frequency reader through the capacitor, and
    each of the plurality of coupling circuits produces a magnetic flux from the respective core that is similarly concentrated and directed to generate a magnetic flux coupling between the plurality of coupling circuits and to transfer power and data between the external reader and the sensor system.

2. The component of claim 1, wherein the first coil winding is a copper winding.

3. The component of claim 1, wherein the sensor is one of a digital sensor and an analog sensor.

4. The component of claim 1, wherein the sensor is one of an acceleration sensor, a temperature sensor, and a strain sensor.

5. A gas turbine engine, the engine comprising:
    a rotary component comprising one or more of an airfoil, a blade, a nacelle and a vane for the gas turbine engine, the rotary component including:
        a conductive metallic surface having a first portion forming an airfoil,
        a sensor system embedded as a discrete system within the first portion of the conductive metallic surface, wherein communications therefrom penetrates through the conductive metallic surface,
        the sensor system including a magnetic communication system comprising a microcontroller, a sensor coupled to the microcontroller, and a low frequency radio-frequency identification integrated-chip coupled to the microcontroller, and a first coupling circuit of a plurality of coupling circuits, the first coupling circuit coupled to the low frequency radio-frequency identification integrated-chip, and
    a stationary component being external to and proximate the rotary component, the stationary component including a low frequency reader and a second coupling circuit of the plurality of coupling circuits, the second coupling circuit coupled to the low frequency reader;
    each of the plurality of coupling circuits including a capacitor and an inductor, the inductor including a coil winding wound within a core, the coil winding operatively associated with a low frequency magnetic flux, the core comprising a p-core shape (pot core) that includes a base, an outer wall that is cylindrically shaped and extends from the base, the outer wall circumscribing an inner pillar that extends from the base of the core, the core being a ferromagnetic material and the outer wall being spaced apart from the inner pillar such that the coil winding winds around the inner pillar therebetween, and the outer wall including a first slot and a second slot, the a first portion of the coil winding exits the core through the first slot and a second portion of the coil winding exits the core through the second slot,
    wherein
    in the rotary component, the first portion of the coil winding connects to the low frequency radio-frequency identification integrated-chip, and the second portion of the coil winding connects to the low frequency radio-frequency identification integrated-chip through the capacitor, in the stationary component, the first portion of the coil winding connects to the low frequency reader, and the second portion of the coil winding connects to the low frequency reader through the capacitor, and each of the plurality of coupling circuits produces a magnetic flux from the respective core that is similarly concentrated and directed to generate a magnetic flux coupling between the plurality of coupling circuits and to transfer power and data between the external reader and the sensor system.

6. The gas turbine engine of claim 5, wherein the first coil winding is a copper winding.

7. The gas turbine engine of claim 5, wherein the sensor is one of a digital sensor and an analog sensor.

8. The gas turbine engine of claim 5, wherein the sensor is one of an acceleration sensor, a temperature sensor, and a strain sensor.

9. A method of wirelessly communicating between a sensor system embedded in a rotary component of a gas turbine engine, and an external reader in a stationary component by reducing eddy currents produced therefrom, wherein:

the rotary component comprises one or more of an airfoil, a blade, a nacelle and a vane for the gas turbine engine, the rotary component including:

a conductive metallic surface having a first portion forming an airfoil, a sensor system embedded as a discrete system within the first portion of the conductive metallic surface, wherein communications therefrom penetrates through the conductive metallic surface, the sensor system including a magnetic communication system comprising a microcontroller, a sensor coupled to the microcontroller, and a low frequency radio-frequency identification integrated-chip coupled to the microcontroller, and a first coupling circuit of a plurality of coupling circuits, the first coupling circuit coupled to the low frequency radio-frequency identification integrated-chip, and the stationary component is external to and proximate the rotary component, the stationary component including a low frequency reader and a second coupling circuit of the plurality of coupling circuits, the second coupling circuit coupled to the low frequency reader;

each of the plurality of coupling circuits includes a capacitor and an inductor, the inductor including a coil winding wound within a core, the coil winding operatively associated with a low frequency magnetic flux, the core comprising a p-core shape (pot core) that includes a base, an outer wall that is cylindrically shaped and extends from the base, the outer wall circumscribing an inner pillar that extends from the base of the core, the core being a ferromagnetic material and the outer wall being spaced apart from the inner pillar such that the coil winding winds around the inner pillar therebetween, and the outer wall including a first slot and a second slot, the a first portion of the coil winding exits the core through the first slot and a second portion of the coil winding exits the core through the second slot, wherein in the rotary component, the first portion of the coil winding connects to the low frequency radio-frequency identification integrated-chip, and the second portion of the coil winding connects to the low frequency radio-frequency identification integrated-chip through the capacitor, in the stationary component, the first portion of the coil winding connects to the low frequency reader, and the second portion of the coil winding connects to the low frequency reader through the capacitor, and the method comprising:

each of the plurality of coupling circuits producing a magnetic flux from the respective core that is similarly concentrated and directed to generate a magnetic flux coupling between the plurality of coupling circuits and to transfer power and data between the external reader and the sensor system.

10. The method of claim 9, wherein the second core is manufactured from a ferromagnetic material.

11. The method of claim 9, wherein the sensor system includes one of an acceleration sensor, a temperature sensor, and a strain sensor.

12. The method of claim 9, wherein the sensor system includes one of a digital sensor and an analog sensor.

\* \* \* \* \*